United States Patent
Chapman et al.

(10) Patent No.: US 10,671,154 B1
(45) Date of Patent: Jun. 2, 2020

(54) SYSTEM AND METHOD FOR PROVIDING DYNAMIC VIRTUAL REALITY GROUND EFFECTS

(71) Applicant: Disney Enterprises, Inc., Burbank, CA (US)

(72) Inventors: Steven M. Chapman, Thousand Oaks, CA (US); Joseph Popp, Burbank, CA (US); Alice Taylor, Burbank, CA (US); Samy Segura, Glendale, CA (US); Mehul Patel, Stevenson Ranch, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/226,495

(22) Filed: Dec. 19, 2018

(51) Int. Cl.
*G06F 3/01* (2006.01)
*G06F 3/147* (2006.01)

(52) U.S. Cl.
CPC .............. *G06F 3/011* (2013.01); *G06F 3/147* (2013.01); *G06F 2203/012* (2013.01)

(58) Field of Classification Search
CPC ................................................. G06F 2032/012
See application file for complete search history.

(56) References Cited

U.S. PATENT DOCUMENTS

| | | | |
|---|---|---|---|
| 6,160,955 A * | 12/2000 | Bicciato | A63B 22/02 318/434 |
| 8,675,018 B2 | 3/2014 | Mishra et al. | |
| 8,847,989 B1 * | 9/2014 | Berme | G06F 3/0414 345/633 |
| 10,080,951 B2 | 9/2018 | Buvid et al. | |
| 10,117,602 B1 * | 11/2018 | Berme | A61B 5/0077 |
| 10,216,262 B1 * | 2/2019 | Berme | A63B 71/0622 |
| 10,231,662 B1 * | 3/2019 | Berme | G06F 3/011 |
| 10,390,736 B1 * | 8/2019 | Berme | A61B 5/1038 |
| 2005/0148432 A1 * | 7/2005 | Carmein | A63B 22/0235 482/8 |
| 2009/0325699 A1 * | 12/2009 | Delgiannidis | A63F 13/06 463/32 |
| 2010/0035726 A1 | 2/2010 | Fisher et al. | |

(Continued)

FOREIGN PATENT DOCUMENTS

WO 2018046077 A1 3/2018

OTHER PUBLICATIONS

Karev, Kirill, "Behold the Next Generation VR Technology: Part 5—Locomotion," Medium, Mar. 9, 2018, <https://medium.com/inborn-experience/behold-the-next-generation-vr-technology-part-5-locomotion-c92d66d4a33e>.

(Continued)

*Primary Examiner* — Chad M Dicke
(74) *Attorney, Agent, or Firm* — Dorsey & Whitney LLP

(57) ABSTRACT

One or more embodiments of the present disclosure include a system for providing dynamic virtual reality ground effects. The system includes a user interface surface and multiple motors coupled to the user interface surface. At least one of the motors is coupled to a virtual reality component of an electronic device. A first motor of the multiple motors is driven by movement of the user interface surface and is used to generate a feedback electrical signal in response to the movement of the user interface surface. A second motor of the multiple motors is driven using the feedback electrical signal.

19 Claims, 6 Drawing Sheets

(56) References Cited

U.S. PATENT DOCUMENTS

| | | | |
|---|---|---|---|
| 2014/0111424 A1* | 4/2014 | Goetgeluk | G06F 3/011 |
| | | | 345/156 |
| 2015/0141200 A1* | 5/2015 | Murray | A63B 21/154 |
| | | | 482/5 |
| 2015/0238817 A1* | 8/2015 | Watterson | A63B 22/0023 |
| | | | 482/8 |
| 2018/0214730 A1 | 2/2018 | Chen et al. | |
| 2018/0085615 A1* | 3/2018 | Astolfi | A63B 21/0058 |
| 2018/0050257 A1 | 8/2018 | Larose et al. | |
| 2019/0038931 A1* | 2/2019 | Chou | A63B 22/025 |

OTHER PUBLICATIONS

Yang, H.T., et al., "A Grid-Connected Energy Conversion System for a Treadmill with Auto-transferring Modes between a Motor and a Generator," IEEE, IECON 2015—41st Annual Conference of the IEEE Industrial Electronics Society, Nov. 9-12, 2015, <https://ieeexplore.ieee.org/document/7392118>.

StriderVR, <https://www.stridervr.com/developers>.

* cited by examiner

SYSTEM AND METHOD FOR PROVIDING DYNAMIC VIRTUAL REALITY GROUND EFFECTS

BACKGROUND

Devices such as a virtual reality headset and a treadmill may be used in tandem to provide a virtual reality experience. For example, a treadmill may be used to allow a user to walk while the user is experiencing virtual reality content. When the user walks in place on the treadmill, the virtual reality content changes accordingly so that the user appears to walk across a surface.

SUMMARY

Certain systems that use a treadmill for virtual reality experiences have several problems. In such systems, the effort required to overcome inertia or momentum associated with the treadmill creates an unrealistic virtual reality experience when a user begins or stops walking or running or changes walking/running speed. Furthermore, such systems do not dynamically limit the user's walking or running speed, thus allowing users to fall off the treadmill while using the system if the user begins moving too fast or too slow. In addition, some treadmill-based systems do not provide a realistic virtual reality experience when the user is moving over certain types of virtual surfaces or in certain types of virtual reality environments.

In view of the above shortcomings in certain systems, there is a need for a system that provides for realistic movement of a user interface surface (e.g., on a treadmill or other mechanism) so that such movements can more closely correspond to virtual reality content presented to the user. In one or more embodiments, more realistic movement is provided by multiple motors coupled to a user interface surface. At least one of the motors can be used to assist a user in overcoming inertia associated with the user interface surface, for example when the user begins walking or running. Additionally or alternatively, when the user stops walking, the motor(s) may be used to dampen the inertia of the user interface surface. Further, at least one of the motors can be used to dynamically slow the user interface surface down when the user begins to move too fast and is in danger of falling off the user interface surface. At least one of the motors can be used to control the user interface surface to simulate different surfaces that may be presented to the user in the virtual reality or other content, such as snow and other types of surfaces.

In this connection, one or more embodiments of the present disclosure include systems, methods, and devices capable of providing dynamic virtual reality ground effects, as well as interconnected motor(s), processor(s), and/or circuitry, to control a user interface surface (e.g., a treadmill-like apparatus) based on one or more of characteristics of the user interface, virtual reality or other content presented to a user, the user's movement, and other features that will be described herein.

One or more embodiments of the disclosure involve a system for providing dynamic virtual reality ground effects. The system may include a user interface surface and multiple motors coupled to the user interface surface. At least one of the motors is coupled to a virtual reality component of an electronic device. A first motor of the multiple motors is driven by movement of the user interface surface and is used to generate a feedback electrical signal in response to the movement of the user interface surface. A second motor of the multiple motors is driven using the feedback electrical signal.

The system may also include a third motor of the multiple motors that is driven using a source. The virtual reality component is optionally adapted to vary an input electrical signal applied to the third motor using the source. The virtual reality component may also be adapted to vary the input electrical signal applied to the third motor based on virtual reality content presented using a display coupled to the electronic device. The source may be a voltage source and the virtual reality component may be adapted to vary the input electrical signal by cyclically changing a voltage applied to the third motor.

In one or more embodiments, the second motor is driven by a reverse polarity version of the feedback electrical signal. The second motor may be driven by the reverse polarity version of the feedback electrical signal when a detected speed of the user interface surface exceeds a threshold. The system may include a third motor of the multiple motors that is driven using a voltage source, and when the detected speed exceeds the threshold, the third motor may be driven with a reverse polarity voltage from the voltage source. In one or more embodiments, a straight polarity version of the feedback electrical signal is used to drive the second motor when the user interface surface transitions from a stationary to a non-stationary state.

In one or more embodiments, the virtual reality component is adapted to use an electrical signal generated using at least one of the multiple motors to make a change to virtual reality content presented to a user via a display associated with the electronic device. The change to the virtual reality content may include a directional change, a rotational change, or a vertical change.

One or more embodiments of the disclosure involve a method for providing dynamic virtual reality ground effects. The method includes a user interface surface obtaining user input. The method also includes the user interface moving in response to the user input and driving a first motor. The method further includes the first motor generating a feedback electrical signal in response to movement of the user interface surface. Additionally, the method includes driving a second motor using the feedback electrical signal, where the second motor is coupled to the user interface surface.

The method optionally includes driving a third motor using a source, where the third motor is coupled to the user interface surface. The method may also include varying an input electrical signal that is applied to the third motor using the source. Varying the input electrical signal may be done using virtual reality content presented to a user of the user interface surface. The source may be a voltage source and varying the input electrical signal may include cyclically changing a voltage applied to the third motor.

In one or more embodiments of the method, if a detected speed of the user interface surface exceeds a threshold, driving the second motor using the feedback electrical signal includes driving the second motor by a reverse polarity version of the feedback electrical signal. The method may further include driving the third motor with a reverse polarity voltage from a voltage source if the detected speed of the user interface surface exceeds the threshold.

In one or more embodiments, the method further includes using an electrical signal generated using one or more of the first motor and the second motor to change virtual reality content.

One or more embodiments of the disclosure involve an electronic device for providing dynamic virtual reality ground effects. The electronic device includes logic circuitry coupled to a memory. The memory stores instructions that, when executed, cause the logic circuitry to perform certain operations. One such operation is to obtain movement information for a user interface surface using one or more motors. Another such operation is to use the movement information to change virtual reality content presented to a user by a display. Another such operation is to control the user interface surface by changing electrical signals used to drive one or more of the motors.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below. Examples are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

One or more embodiments of the present disclosure are directed to systems, methods, and devices for providing dynamic virtual reality ground effects and content. In various examples described herein, movement of a user interface surface is modified and/or controlled to better match, fit with, or otherwise relate to virtual reality content that is being displayed to a user, thus providing the user with an improved and/or more realistic virtual experience.

The details of some example embodiments of the systems, methods, and devices of the present disclosure are set forth in this description and in some cases, in other portions of the disclosure. Other features, objects, and advantages of the disclosure will be apparent to one of skill in the art upon examination of the present disclosure, description, figures, examples, and claims. It is intended that all such additional systems, methods, devices, features, and advantages be included within this description (whether explicitly or by reference), be within the scope of the present disclosure, and be protected by one or more of the accompanying claims.

Figure 1A:
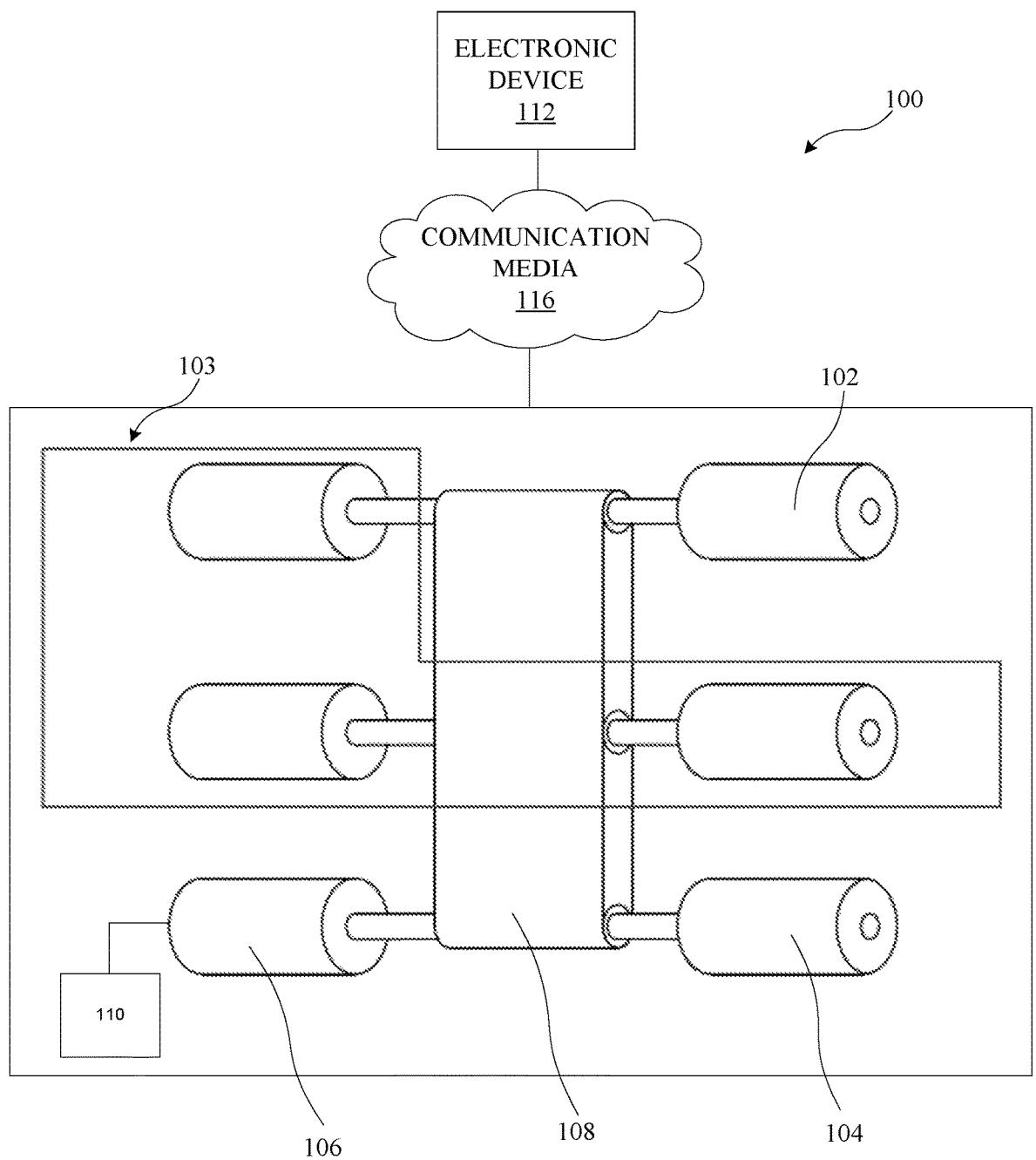
FIG. 1A illustrates an example system used to provide dynamic virtual reality ground effects in accordance with one or more embodiments of the disclosure.

FIG. 1A depicts an example of system 100 that may be used to provide dynamic virtual reality ground effects. As shown in FIG. 1A, one or more embodiments of system 100 include motor 102, motor 104, and/or motor 106, one or more of which may be coupled to user interface surface 108. System 100 may alternatively or additionally include one or more of motors 103 that in combination with one or more of motor 102, motor 104, and/or motor 106 can be used to control the virtual reality experience of a user.

Figure 1B:
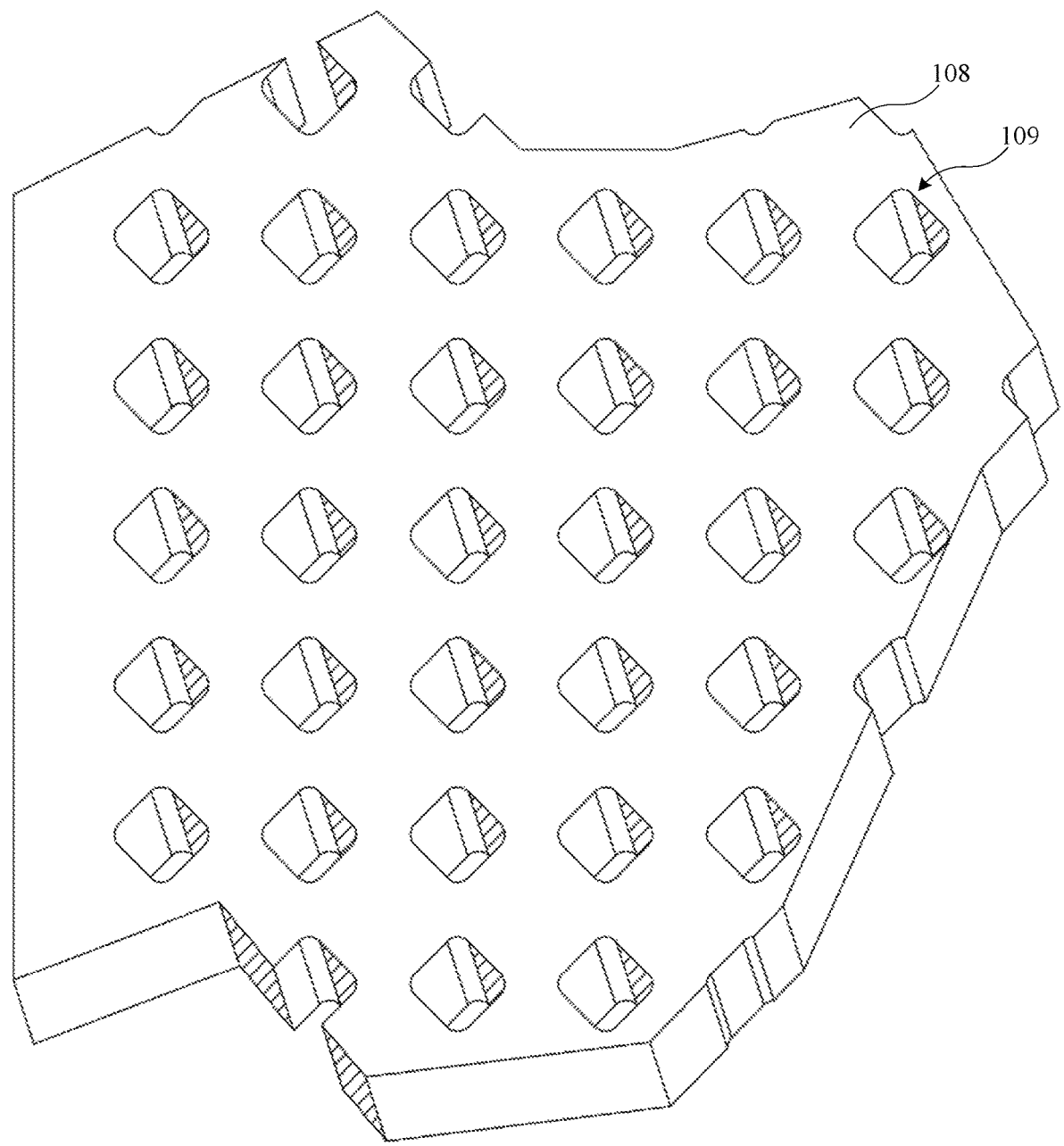
FIG. 1B illustrates an example user interface surface in accordance with one or more embodiments of the disclosure.
Figure 1C:
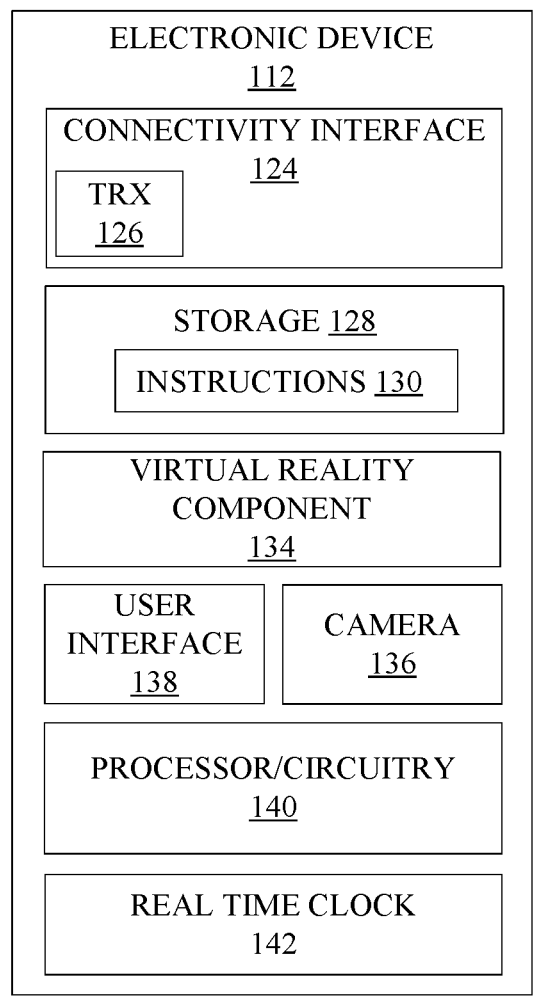
FIG. 1C illustrates an example electronic device according to one or more embodiments of the disclosure.

FIG. 1B shows example user interface surface 108 that in one or more embodiments includes holes 109. User interface surface 108 may include rubber or other reasonably pliable and/or durable material. User interface surface 108 may use or include a surface coupled to or in contact with one or more movable apparatuses, such as a wheels or the like, such that user interface surface 108 may move in response to user movement or force. In one or more embodiments, user interface surface 108 includes a treadmill-like surface. User interface surface 108 may allow asymmetric differential and localized motion effects. That is, in one or more embodiments, not all portions of user interface surface 108 need to move in uniform fashion, thus enabling flexibility in the aspects of movement that can be detected using user interface surface 108 and the types of feedback and/or ground effects that can be provided using user interface surface 108 and motors 102, 103, 104, and/or 106. User interface surface 108 may be at least partially surrounded by (padded) bars or other elements that can be used to prevent a user from falling off user interface surface 108.

Returning to FIG. 1A, the number of motors used in system 100 is not limited and may vary depending on the desired virtual reality experience or other parameters. In one or more embodiments, system 100 provides dynamic virtual reality ground effects using multiple motors that may be connected to user interface surface 108. Source/sink 110 (e.g., a voltage or current source) may be coupled to any of motors 102, 103, 104, and 106, to provide a voltage, current, and/or other electrical signals to the motor(s) and/or to obtain or generate a voltage, current, and/or other signal using the motor(s).

Motor(s) 102, 103, 104, and/or 106 in system 100 may be used to control or assist with the movement of user interface surface 108. Motor(s) 102, 103, 104, and/or 106 may also act as generators by generating electrical signals that may be used to drive, provide input to, and/or control other components of system 100, such as other motor(s), user interface surface 108, and electronic device 112 (including, e.g., virtual reality component 134, shown in FIG. 1B), as described herein. Further, motors 102, 103, 104, and/or 106 may act as self-regulating generators in a feedback loop, in that one or more motors 102, 103, 104, and 106 that may be in the feedback loop may be used to generate electrical signals used to drive one or more other motors 102, 103, 104, and/or 106 in the feedback loop to control, assist in, and/or regulate the movement of user interface surface 108, as described herein.

Via communication media 116, electronic device 112 may be coupled to any of motors 102, 103, 104, and 106 and/or to user interface surface 108. In this manner, electronic device 112 may provide input to the motor(s) and/or to user interface surface 108 for control purposes, and/or may obtain input from the motor(s) and/or user interface surface 108 for purposes of controlling virtual reality or other content (e.g., augmented reality content) that may be presented to the user. As described in connection with FIG. 1B, among other features, electronic device 112 may include virtual reality component 134 that may be used to control the motor(s) and/or user interface surface 108 and/or to control the virtual reality or other content presented to the user. It should also be appreciated that additional electronic/remote devices may be coupled to components within system 100 via communication media 116. As will be described in detail herein, electronic device 112, motors 102, 103, 104, 106, user interface surface 108, and/or additional remote devices may exchange communications signals via communication media 116, including, for example, movement information, voltages and/or currents generated using motor(s) 102, 103, 104, 106 and/or electronic device 112, and information representing aspects of virtual reality or other content for display to a user of system 100.

Motors 102, 103, 104, and 106 may act as input and/or output devices. For example, in response to movement of user interface surface 108, any of motors 102, 103, 104, 106 may be used to generate electrical signals that may be applied to other motors 102, 103, 104, 106, source/sink 110, virtual reality component 134 (as shown in FIG. 1B), electronic device 112 (e.g., via communication media 116), and/or additional electronic/remote devices (e.g., via communication media 116). It should be noted that user interface surface 108 can be used to detect a user's desired movement by monitoring or otherwise detecting a user's foot pressure or force on user interface surface 108. The detected pressure or force may be provided to electronic device 112, which may process the provided information for purposes of controlling motor(s) 102, 103, 104, 106. Motor(s) 102, 103, 104, 106 may then control user interface surface 108 to track the desired movement. In this example situation and in other embodiments of the disclosure, it is not necessarily the user's movement or muscle exertion that propels user interface surface 108, and user interface surface 108 does not necessarily continue to move based on momentum/friction in a physically-based manner. Rather, user interface surface 108 can be electronically controlled using electronic device 112. Motors 102, 103, 104, and 106 may obtain electrical signals from any number of sources, including user interface surface 108, other motors 102, 103, 104, 106, electronic device 112 (e.g., via communication media 116), virtual reality component 134, and/or additional electronic/remote devices (e.g., via communication media 116). As will be described herein, the foregoing electrical signals may be used to control the various components of system 100, including to control the movement of user interface surface 108, and hence provide a dynamic and improved virtual reality experience.

By way of example, the various components of system 100 may be used to provide an improved virtual reality content experience, including, e.g., where system 100 is designed to detect multiple aspects of user movement, gestures, and/or poses in order to provide dynamic feedback for improving the user experience. For example, system 100 may control the movement of user interface surface 108 when a user begins to walk or run, stops walking or running, or changes walking or running speeds. In this manner, the inertia associated with user interface surface 108, which may cause an unrealistic walking experience, may be overcome. In one or more embodiments, motor 102 may be driven by movement of user interface surface 108 caused by the user of system 100. Motor 102 may be coupled to motor 104 in order for motor 102 and motor 104 to communicate with each other (e.g., in a feedback loop). Motor 104 may be driven by feedback signals generated using and/or obtained from motor 102. For example, motor 102 may be used to generate a feedback electrical signal (e.g., a voltage or current) that may be applied to and used to drive motor 104, in response to the movement of user interface surface 108. This feedback electrical signal may cause motor 104 to reduce the inertia effects associated with user interface surface 108 and thus create a more realistic virtual reality experience for the user of system 100. In this manner, motor 102 may act as a self-regulating generator in the feedback loop, in that motor 102 may be used to generate electrical signals used to drive motor 104 to control, assist in, and/or regulate the speed and movement of user interface surface 108 in response to user-generated input.

By way of example, if the user transitions from a stationary to non-stationary state, this transition may be detected and the movement of motor 102 may be used to generate a feedback electrical signal. A straight polarity version of this feedback electrical signal may then be fed back to motor 104 to cause motor 104 to assist in the process of speeding up user interface surface 108. In this manner, a feedback configuration of motors 102 and 104 may be used to prevent unnatural ground drag as the user begins transitioning to a non-stationary state. Additionally, system 100 may reposition a user that is about to walk or fall off of user interface surface 108. As an example, the user of system 100 may be running and suddenly reduce speed to a walking or stationary state. Due to inertia, user interface surface 108 may initially continue to move at the increased rate of speed, and may pull the user toward an edge of user interface surface 108. Motor 102 may detect the user's deceleration and may be used to generate a reverse polarity version of a feedback signal to drive motor 104 to begin braking and slowing the movement of user interface surface 108 to overcome the inertia thereof and better match the speed of the user before the user falls off user interface surface 108.

Motors 102, 103, 104, and 106 of system 100 may also be used to control increased speed of motion when user interface surface 108 exceeds a threshold speed. For example, when a detected speed of user interface surface 108 meets or exceeds a threshold, motor 102 may be used to generate a reverse polarity version of a feedback electrical signal for motor 104. The reverse polarity signal may then drive motor 104 to dynamically counter motor 102, thus reducing the speed of user interface surface 108 and helping reposition the user and/or prevent the user from reaching unsafe speeds or from running off user interface surface 108.

System 100 may also be used to generate ground-initiated phenomena, for example, vibration or dynamic external forces such as vehicle acceleration or walking through snow or on another surface. By way of illustration, if the user comes across water, sand, snow, mud, slime, or another surface in the virtual reality or other environment, source/sink 110 (as described in further detail below) may be used to generate an electrical signal that can cause motor 106 to increase a resistance associated with user interface surface 108. This increased resistance may require the user to exert additional force to take each step and move user interface surface 108, thus simulating the increased difficulty of walking through water, sand, snow, mud, slime, etc. The increased resistance may be effected using motor 106. By way of example, motor 106 may obtain cyclically changing voltages or currents from source/sink 110, as described in further detail below, to (in some cases rapidly) increase and/or decrease the resistance of user interface surface 108 to movement, in order to simulate the experience of walking on/in such abnormal surfaces. A controller may be used in the feedback loop between motor 102 and motor 104 to generate ground-initiated phenomena using motor 104 instead of or in addition to motor 106.

System 100 may also be used to detect user movement and poses to allow user gestures, such as turning, leaning, climbing, crouching, jumping, or sitting, to control commands or requests and change virtual reality or other content presented to the user. Further gestures may include a user performing hand movements/gestures. As an example, while walking, a user may wish to position user's body closer to the right side of user interface surface 108, to cause the perspective in a virtual reality or other environment to begin turning to the right. A virtual reality or other environment may include any simulation, game, training/educational service, social space, work space, etc., that may be designed to immerse a user in a virtual reality or other environment. As the user moves closer to the right edge of user interface surface 108, motors 102 and/or 104, for example, which may be on the right side of user interface surface 108, may turn faster than, for example, motor 106, which may be on the left of user interface surface 108, and thus be used to generate a relatively higher voltage, current, or other signal. These differences in voltage/current etc. may be interpreted as a user-generated command to cause the perspective in the virtual reality or other environment to turn to the right.

Sensors, such as infrared cameras or other sensors, may also be employed to provide dynamic virtual reality ground effects. For example, an infrared camera may capture movement of a user's foot regardless of whether the user's foot is in contact with user interface surface 108. The infrared camera or other sensor may, by way of illustration, be coupled to electronic device 112 and provide electronic device 112 with captured information. Electronic device 112 can then process the captured information to provide, among other things, control of motor(s) 102, 103, 104, 106. Alternatively or additionally, electronic device 112 can use the captured information to estimate or predict the user's movement on user interface surface 108, the appropriate ground effects that should be implemented on a going forward basis, the appropriate motor control(s) that should be implemented, the appropriate changes to virtual reality or other content displayed to a user, etc.

Additionally, a user may take a step with user's foot positioned at an angle, thus exerting more force toward the edge of user interface surface 108. If a user steps in this fashion with the user's right foot but not the left foot, for example, motors 102 and/or 104 may spin faster than motor 106 (assuming motors 102 and/or 104 are on the right side of user interface and motor 106 is on the left side of user interface 108, which need not be the case). Motors 102 and/or 104 may thus be used to generate relatively higher microcurrents or voltages than motor 106 in response to this user input. These microcurrents and/or voltages may be interpreted as a user-generated command to instruct, for example, a character in the virtual reality or other environment to move to the right, by way of illustration to avoid an object or projectile in the virtual reality or other environment.

In one or more embodiments, with the use of a camera or other detection mechanism pointed toward a user of system 100, a user may perform hand movements/gestures in order to alter the content in the virtual reality or other environment. The camera etc. may be communicatively coupled to electronic device 112 through communication media 116, allowing the camera etc. to provide input to electronic device 112 that electronic device 112 can use to alter virtual reality or other content. As an example, if a user's path in the virtual reality or other environment is obstructed by an object, the user may wish to push the user's hands to move the object out of the way. Upon the user making a pushing movement in the real world, the camera may detect this movement and generate input that may be interpreted (e.g., by electronic device 112) as a user-generated command to move the obstructing object in the virtual reality or other environment.

In order to increase the accuracy involved in detecting the various voltages and currents that may be generated using motors 102, 103, 104, and/or 106, source/sink 110, and/or electronic device 112, in response to the different movements/gestures performed by the user, one or more embodiments include a tutorial service that may be used for calibration purposes. For example, during a tutorial, a user may be asked to perform a variety of movements/gestures that may be performed while user interacts with the virtual reality or other environment. Components of system 100, such as motor(s) 102, 103, 104, 106, user interface surface 108, a camera, electronic device 112 (including virtual reality component 134), and/or any other component described herein, may be used to generate a voltage or current in response to each of these different movements/gestures. As a voltage or current is generated with the movement/gesture in the tutorial, electronic device 112 may store information relating to the voltage or current associated with the movement/gesture.

Storing this information may enable electronic device 112 to trigger the correct command in the virtual reality or other environment in response to the user's movement/gesture. By way of example, the tutorial may ask the user to perform movements/gestures described above, such as walking closer to an edge of user interface surface 108 or stepping with user's foot at an angle. Once the voltage or current associated with these acts is stored during the tutorial service, electronic device 112 may more accurately detect when the user performs the acts later by detecting the same or similar voltages or currents as the voltages or currents generated during the tutorial. So, for example, when the user decides to walk closer to the edge of user interface surface 108, electronic device 112 can more accurately implement the command associated with this movement, instead of mistaking the movement and implementing a command associated with another movement/gesture. This calibration process may be used for any user-generated commands that may be used in conjunction with system 100 to provide a more accurate virtual reality or other experience.

In one or more embodiments, user interface surface 108 may use or include one or more force sensors. Force sensors may include a load pin, load cell, a force transducer, etc. Force sensors may be used to measure forces applied to various portions of user interface surface 108. The measured force can be used along with speed measurements of user interface surface 108 to provide increased accuracy in detecting user-generated gesture commands. As an example, a user may wish to lean to the side of user interface surface 108 to cause a character in a virtual reality or other environment to lean similarly. An electrical signal may then be generated that corresponds to such a position (e.g., leaning). Electronic device 112 (e.g., by virtual reality component 134) may process this electrical signal and cause the character in the virtual reality or other environment to lean to the left.

As alluded to above, FIG. 1A also shows that motor 106 may be included in system 100 to provide an alternative or additional means of controlling the movement of user interface surface 108. Motor 106 may be coupled to source/sink 110. Source/sink 110 may output one or more currents or voltages to motor 106 and/or may obtain as input one or more currents or voltages from motor 106. It should also be appreciated that source/sink 110 may additionally or alternatively be coupled to any other motors of system 100. In one or more embodiments, source/sink 110 may provide an electrical signal to motor 106 to control motor 106 independently of other motors in system 100. For example, whereas motor 104 may be controlled with a signal generated using motor 102, motor 106 may be controlled using a signal from source/sink 110. It should also be appreciated that in one or more embodiments, a combination of feedback from another motor and input from source/sink 110 may also be used. For example, motor 104 may obtain feedback from motor 102 and also obtain input from source/sink 110.

Motor 106 may be used in conjunction with other motor(s) 102, 103, 104 to provide dynamic virtual reality ground effects. By way of example, in some cases, the combination of motor 102 and motor 104 may not provide sufficient assistance when user interface surface 108 starts transitioning from a stationary to a non-stationary state. For example, this may be the case where the movement of user interface surface 108 is not sufficient to drive motors 102 and 104 at the requisite level. In such cases, source/sink 110 may be used to generate a straight polarity input signal that may cause motor 106 to assist in speeding up user interface surface 108. Additionally or alternatively, motor 106 in conjunction with source/sink 110 may be used instead of motors 102 and/or motor 104 to assist the user in overcoming the inertia associated with user interface surface 108. In one or more embodiments, source/sink 110 may be used to generate a reverse polarity input signal for motor 106 that can be used to cause motor 106 to aid motor 104 in slowing the speed of user interface surface 108 (e.g., if the speed of user interface surface 108 meets or exceeds a threshold). Motor 106 can also be used without motor 104 to slow the speed of user interface surface 108.

FIG. 1A shows that in addition to motors 102, 103, 104, and 106 and user interface surface 108, system 100 can, as alluded to above, include electronic device 112 coupled to other elements of system 100 through communication media 116. In one or more embodiments, communication media 116 may be based on one or more wireless communication protocols such as Bluetooth®, ZigBee, 802.11 protocols, Infrared (IR), Radio Frequency (RF), 2G, 3G, 4G, 5G, etc., and/or wired protocols and media. Communication media 116 may including cables/wires. Communication media 116 may be implemented as a single medium in some cases.

Communication media 116 may be used to connect or communicatively couple electronic device 112 and remote devices, to one another or to a network, and communication media 116 may be implemented in a variety of forms. For example, communication media 116 may include an Internet connection, such as a local area network (LAN), a wide area network (WAN), a fiber optic network, internet over power lines, a hard-wired connection (e.g., a bus), and the like, or any other kind of network connection. Communication media 116 may be implemented using any combination of routers, cables, modems, switches, fiber optics, wires, radio (e.g., microwave/RF links), and the like. Further, communication media 116 may be implemented using various wireless standards, such as Bluetooth, Wi-Fi, 3GPP standards (e.g., 2G GSM/GPRS/EDGE, 3G UMTS/WCDMA/HSPA/HSPA+/CDMA2000, 4G LTE/LTE-U/LTE-A, 5G), etc. Upon studying the present disclosure, one of skill in the art will recognize other ways to implement communication media 116 for communications purposes.

In example implementations, communication media 116 may be or include a wired or wireless wide area network (e.g., cellular, fiber, and/or circuit-switched connection, etc.) for electronic device 112 and other remote devices, which may be relatively geographically disparate; and in some cases, aspects of communication media 116 may involve a wired or wireless local area network (e.g., Wi-Fi, Bluetooth, unlicensed wireless connection, USB, HDMI, standard AV, etc.), which may be used to communicatively couple aspects of system 100 that may be relatively close geographically.

Electronic device 112 and/or additional remote devices that may be present in system 100 may use or include a variety of electronic computing devices, such as, for example, a virtual reality headset, a smartphone, tablet, laptop, desktop PC, wearable device, etc. By way of example, electronic device 112 and/or additional remote devices may include or be used in conjunction with devices adapted for virtual reality and/or augmented reality applications, such as a headset, glasses, gloves, etc. A graphical user interface (GUI) of electronic device 112 may perform such functions as accepting certain types of user input and displaying virtual reality or other content. The GUI may be provided using any operating systems or other software application, such as, for example, iOS, Android, Windows Mobile, Windows, Mac OS, Chrome OS, Linux, Unix, a gaming platform OS (e.g., Xbox, PlayStation, Wii), etc.

As mentioned, electronic device 112 and other remote devices may take a variety of forms, such as a virtual reality headset, desktop or laptop computer, a smartphone, a tablet, a smartwatch or other wearable electronic device, a television or other audio or visual entertainment device or system, a camera (including still shot or video) or the like. Electronic device 112 and other remote devices may communicate with other devices and/or with one another using communication media 116. Electronic device 112 and other remote devices may be used to perform various operations described herein with regard to one or more disclosed systems and methods. As an example, system 100 may connect via communication media 116 to virtual reality headsets of other virtual reality etc. users, allowing multiple users within a given virtual reality or other environment to communicate and interact with one another. Upon studying the present disclosure, one of skill in the art will appreciate that system 100 may include multiple electronic devices 112, remote devices, and communication media 116.

FIG. 1B depicts an example of electronic device 112 that includes examples of additional aspects of the present disclosure that may be implemented in connection with system 100. Electronic device 112 may be couplable to a virtual reality device such as a headset. In one or more embodiments, electronic device 112 may be or be used as a virtual reality device. As illustrated, electronic device 112 may include connectivity interface 124, which may further include transceiver 126 to communicatively couple electronic device 112 to, for example, remote devices and/or components of system 100, via communication media 116. In the illustrated embodiment, electronic device 112 further includes storage 128 (which in turn may store instructions 130), virtual reality component 134, camera 136, processor/circuitry 140, real time clock 142 (which may be used to provide a clock or multiple clocks for electronic device 112), and user interface 138 (e.g., a GUI), which may be used to present virtual and other content to a viewer using a display of electronic device 112. A bus (not shown in FIG. 1B) may be used to interconnect the various elements of electronic device 112 and transfer data between these elements. It should be appreciated at this juncture that in embodiments, remote devices may be substantially similar to electronic device 112, including all or some of the components of electronic device 112 shown in FIG. 1B.

In FIG. 1B, connectivity interface 124 may interface electronic device 112 to communication media 116, such that electronic device 112 may be communicatively coupled to remote devices and/or elements of system 100 via communication media 116. Transceiver 126 of connectivity interface 124 may include multiple transceiver modules operable on different wireless standards. Transceiver 126 may be used to send/receive movement information from remote devices and/or user interface surface 108 and/or motors 102, 103, 104, 106, and in some cases, to send/receive information related to a virtual reality object and/or virtual reality content. Additionally, connectivity interface 124 may include additional components for controlling radio and/or wired connections, such as baseband and/or Ethernet modems, audio/video codecs, and so on.

In embodiments, transceiver 126 may utilize Bluetooth, ZIGBEE, Wi-Fi, GPS, cellular technology, or some combination thereof. Further, although FIG. 1B illustrates a single transceiver 126 for transmitting/receiving information, separate transceivers may be dedicated for communicating particular types of data or for doing so in particular fashions. In some cases, transceiver 126 may include a low energy transmitter/receiver such as a near field communications (NFC) transmitter/receiver or a Bluetooth Low Energy (BLE) transmitter/receiver. In further example implementations, separate wireless transceivers may be provided for receiving/transmitting high fidelity audio and/or video data. In yet additional embodiments, a wired interface (e.g., micro-USB, HDMI, etc.) may be used for communicating data between electronic device 112, remote devices, and/or system 100. In some cases, transceiver 126 may be implemented as only a transmitter with no receiver. In some cases, transceiver 126 may be implemented as only a receiver with no transmitter.

Storage 128 may include volatile memory (e.g., RAM) and/or non-volatile memory (e.g., flash storage), may include any of EPROM, EEPROM, cache, or may include some combination/variation thereof. In various embodiments, storage 128 may store user input data and/or other data collected by electronic device 112 (e.g., movement information associated with user interface surface 108, information related to virtual reality or other content displayed to a user, calibration data, voltage or current information from motors 102, 103, 104, 106, or information derived from the foregoing, etc.). Storage 128 may also be used to store downloaded content (e.g., movies, photos, games, virtual or augmented reality programs or applications, and so on) for later retrieval and use, e.g., in connection with the generation and provision of virtual reality or other content. Additionally, storage 128 may store instructions 130 that, when executed using processor/circuitry 140, for example, can cause electronic device 112 to perform various operations that will be described in further detail herein (e.g., in connection with FIGS. 2A, 2B, and 2C).

In various embodiments, a user may interact with electronic device 112 via user interface 138, which may include a display (not shown) for displaying a virtual reality or other environment and/or other virtual or augmented reality content to a user. By way of example, such a display may be implemented in connection with a virtual reality headset that can accept movement information generated by user interaction as inputs. In one or more embodiments, the display may be separate from electronic device 112. For example, electronic device 112 may be a smartphone or the like and the display may be a virtual reality headset that may be coupled to the smartphone. Instructions 130 may be used for processing and/or presenting virtual reality or other content using electronic device 112, according to various operations described herein.

Instructions 130 may be downloaded, installed, and/or initially configured/setup on electronic device 112. For example, electronic device 112 may obtain instructions 130 from a remote device, a server, a component of system 100, or from another source accessed via communication media 116, such as an application store or the like. Following installation and setup, instructions 130 may be used to access movement information, calibration data, and/or modify virtual reality content, as will be described herein. Instructions 130 may also be used to interface with other electronic devices, for example, to obtain motion data captured by a camera, as will be described herein.

Instructions 130 may include various code/functional modules, such as, for example, a movement modification module, a virtual reality content modification module, a motor control module, etc. These modules may be implemented separately or in combination. Each module may use or include computer-readable media and may use or include computer-executable code stored in memory, such that the code may be operatively coupled to and/or executed by processor/circuitry 140 to perform specific functions (e.g., as described herein, including with regard to various systems, operations, and flow diagrams, etc.) with respect to providing virtual reality content and controlling motors 102, 103, 104, 106 and/or source/sink 110. Instructions 130 may be associated with a native application modified with a software design kit (e.g., depending on the operating system) in order to carry out the functionalities/features described herein.

As shown in FIG. 1B, electronic device 112 may include virtual reality component 134. In one or more embodiments, virtual reality component 134 may be integrated into and/or implemented in connection with instructions 130 (e.g., as part of a virtual reality module or the like). In some cases, aspects of instructions 130 relating to virtual reality features may be considered to be part of virtual reality component 134. Virtual reality component 134 may in one or more embodiments also include or use one or more sensors, such as an accelerometer, a gyroscope, a camera, etc. Virtual reality component 134 may also obtain information from peripheral components such as gloves, etc. It should also be appreciated that virtual reality components 134 may have augmented reality capabilities, or may in some cases have augmented but not virtual reality capabilities (e.g., may be considered an augmented reality component).

Virtual reality component 134 may enable electronic device 112 to display virtual reality or other content, and may further use movement information derived from user interface surface 108 and/or motors 102, 103, 104, 106 to modify virtual reality or other content displayed to a user (e.g., by electronic device 112 or other display). As an example, a user may wish to turn the perspective or character around in a virtual reality or other environment to see what is behind the user or to turn back and walk to toward where the user came from. To accomplish this, a user may turn around on user interface surface 108 and begin walking, such that user interface surface 108 begins moving in the opposite direction. Motors 102, 103, 104 and/or 106 may then be used to generate a signal(s) related to this movement, and virtual reality component 134 may interpret the signal(s) and cause the character or camera in the virtual reality or other environment to turn around according to the user-generated command.

Additionally, virtual reality component 134 may be coupled to motor(s) 102, 103, 104, 106 in order to control the same based on virtual reality or other content being presented to a user. For example, if the surface on which the user is walking in the virtual reality or other environment is snow, virtual reality component 134 may be used to control motor 106 that in turn can control user interface surface 108 to replicate the experience of walking in snow. It should also be appreciated that virtual reality component 134 may be coupled to source/sink 110 for purposes of modifying virtual reality or other content based on signaling from source/sink 110, and also for controlling source/sink 110, motor 106, or other motor(s) based on signaling from virtual reality component 134 (e.g., to control user interface surface 108 to approximate the virtual or other environment being presented to the user).

By way of example, virtual reality component 134 may use or include software configured to exchange and/or process information regarding the movement of user interface surface 108 or the virtual reality or other content displayed to a user (e.g., by electronic device 112 or separate display). Using one or more of motors 102, 103, 104, 106, virtual reality component 134 may obtain movement information, and in response to such information may alter the virtual reality or other content displayed to the user. Alternatively or additionally, based on changes to the virtual reality or other environment presented to the user, virtual reality component 134 may be used to control the movement of user interface surface 108 through signaling provided to motors 102, 103, 104, and/or 106, and/or to source/sink 110.

FIG. 1B shows that, as mentioned above, electronic device 112 may include processor/circuitry 140. Processor/circuitry 140 may include a processor or processor modules, including, by way of example, an applications or other processor that interfaces with and/or controls other elements of electronic device 112 (e.g., connectivity interface 124, instructions 130, storage 128, user interface 138, camera 136, and/or virtual reality component 134). Processor/circuitry 140 may include a controller that provides various controls (e.g., interfaces with electronic or physical buttons and switches) related to the operation of camera 136, user interface 138, and the like, and interfaces with drivers of various audio/visual components of electronic device 112. Additionally, the controller may include various controls related to the gathering of movement information, calculations made using the movement information, calibration data, as well as the setting/modification/control of characteristics of virtual reality or other content, such as will be described in further detail herein. Processor/circuitry 140 may be communicatively coupled to virtual reality component 134 such that virtual reality component 134 can use processor/circuitry 140 to execute operations and other features described herein.

Processor/circuitry 140 may include processors (including, in some instances, logic circuits), memory, a battery and power circuitry, and other circuitry drivers for periphery components, such as camera 136 and audio/visual/haptic interfaces that may be included in user interface 138. Processor/circuitry 140 and any processors thereof may include logic circuits for receiving, processing, and/or storing content or information obtained and/or generated by, and/or data input to, electronic device 112, and content or information to be transmitted or delivered (e.g., displayed) by electronic device 112. More particularly, as shown in FIG. 1B, processor/circuitry 140 may be coupled by a bus (not shown) to a display of user interface 138 as well as to connectivity interface 124 and storage 128 (including instructions 130), as well as to virtual reality component 134 and camera 136. It should also be appreciated that processor/circuitry 140 may be coupled to an external display. Hence, processor/circuitry 140 may receive and process electrical signals generated by these respective elements and thus perform various functions. By way of example, processor/circuitry 140 may access stored content from storage 128 at the direction of instructions 130, and process the stored content for display and/or output by user interface 138. Additionally, processor/circuitry 140 may process the stored content for transmission via connectivity interface 124 and communication media 116 to remote devices, a separate (e.g., external) display, and/or components of system 100 such as user interface 108, motors 102, 103, 104, and 106, and/or source/sink 110.

In one or more embodiments, logic circuits of processor/circuitry 140 may further detect, calculate, and/or store data (e.g., movement and virtual reality or other content information) obtained from motors 102, 103, 104, and/or 106 and/or source/sink 110 and/or another remote source (e.g., from a remote device). The logic circuits may use this input to set/modify aspects of the virtual reality or other content being displayed to the user (e.g., using user interface 138 of electronic device 112 or a separate display), as well as to set/modify the movement of user interface surface 108 (e.g., by controlling motors 102, 103, 104, and 106 and/or source/sink 110).

Processor/circuitry 140 may be used to drive/control and/or gather information from other peripheral components not shown in detail in FIG. 1B, such as components of system 100. For example, processor/circuitry 140 may interface with and obtain electrical signals from motors 102, 103, 104, and 106 that may be connected to user interface surface 108, and/or from source/sink 110, and use the electrical signals to modify the virtual reality or other content being presented to the user. For example, processor/circuitry 140 may monitor the voltages and/or currents generated or obtained by source/sink 110, and modify virtual reality or other content as processor/circuitry 140 detects changes to those voltages or currents. Processor/circuitry 140 may also interface with video input/output mechanisms such as HDMI, USB, and the like.

In one or more embodiments, a camera (which may in some cases be substantially similar to camera 136), may be couplable to electronic device 112 via communication media 116, and may be used to obtain movement information. Electronic device 112, through communication media 116, may obtain movement information generated using the camera to alter the virtual reality or other environment and generate improved virtual reality ground effects as described herein. The camera may be designed to detect changes in the body movement and position of a user. For example, the camera may be configured to detect certain user gestures such as hand movement, turning, leaning, climbing, crouching, jumping, and sitting to expand the capacity of system 100 to control/modify virtual reality or other content. As an example, if a user wishes to jump on user interface surface 108 to cause a character in the virtual reality environment to jump, the camera can detect such a movement and generate a signal that may be interpreted by virtual reality component 134 as a user-generated command to cause the character in the virtual reality environment to jump.

Having described some of the various elements of system 100 and electronic device 112 shown in FIGS. 1A and 1B, one or more example embodiments that may use some of these elements to provide dynamic virtual reality ground effects will now be described in connection with FIG. 2A.

Figure 2A:
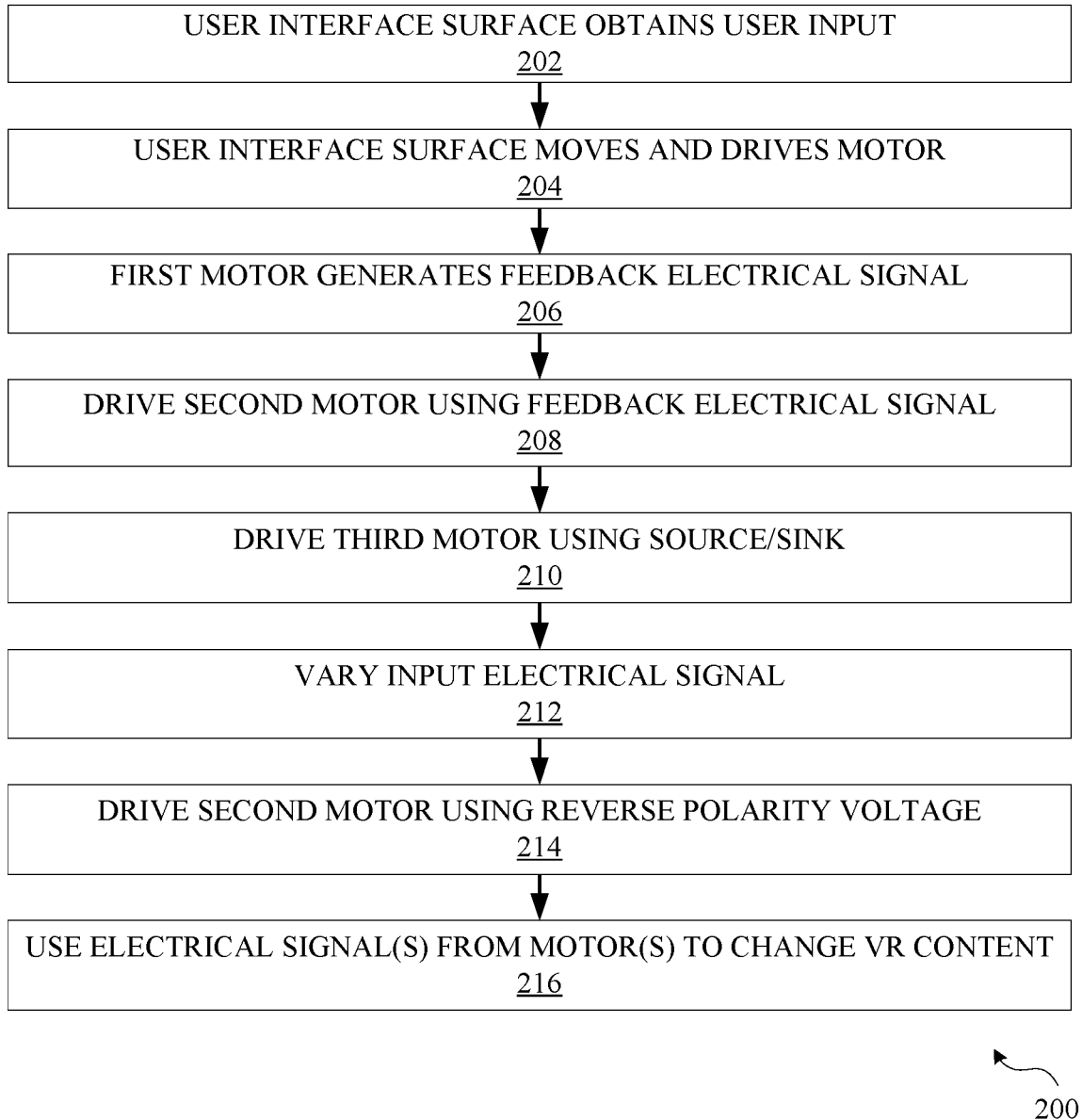
FIG. 2A is an operational flow diagram illustrating an example of providing dynamic virtual reality ground effects.

FIG. 2A illustrates method 200 that may be used to provide dynamic virtual reality ground effects. Here it should be appreciated that the operations described in connection with method 200 and/or other methods described herein need not be performed in the order described or shown. Additionally, it should be appreciated that any operation described may include one or more sub-operations, and/or may be a sub-operation of another operation. Furthermore, additional operation(s) may be interposed between any two described operations without departing from the scope of the disclosure.

At operation 202, method 200 includes user interface surface 108 obtaining user input. For example, a user may engage in an action or gesture that causes user interface surface 108 to obtain the user input. Such action or gesture may include standing still, transitioning from a stationary to non-stationary state (e.g., by starting to walk or run), distributing weight to certain areas of user interface surface 108, and performing other gestures such as turning, leaning, climbing, crouching, jumping, or sitting.

At operation 204, method 200 includes user interface surface 108 moving in response to the user input and driving motor 102 (and/or another motor of system 100). For example, when user interface surface 108 begins moving, such as when a user starts walking or running to transition from a stationary to non-stationary state, this motion may be used to drive motor 102 that may be connected to user interface surface 108. In addition, once a user begins walking at steady speed on user interface surface 108, this may cause motor 102 to be driven at a constant rate. Further, a user may wish to reduce speed on user interface surface 108, such as when a user transitions from running to walking, or transitions from a non-stationary to stationary state, which may reduce or halt the rate at which motor 102 is driven.

At operation 206, method 200 includes motor 102 generating a feedback electrical signal in response to the movement of user interface surface 108. For example, as motor 102 (and/or another motor of system 100) is driven by user interface surface 108 movement, the movement of motor 102 may be used to generate a feedback electrical signal. For example, when a user begins transitioning from a stationary to non-stationary state, such as beginning to walk or run, motor 102 may be used to generate a voltage or current that can be used as a straight polarity version of a feedback electrical signal. If the user begins decelerating, causing user interface surface 108 to reduce speed, such as transitioning from running to walking, motor 102 may be used to generate a voltage or current that can be used as a reverse polarity version of a feedback electrical signal.

At operation 208, method 200 includes driving motor 104 (and/or another motor of system 100) using the feedback electrical signal. Motor 104 may also be coupled to user interface surface 108. Motor 102 may send a variety of feedback electrical signals to drive motor 104. For example, when a user begins transitioning from a stationary to non-stationary state, motor 102 may be used to generate a straight polarity version of the feedback electrical signal to drive motor 104, which may cause motor 104 to begin facilitating the movement of user interface surface 108 so as to reduce non-realistic friction and ground drag as the user begins moving.

At operation 210, method 200 optionally includes driving motor 106 (and/or another motor of system 100) using source/sink 110. Motor 106 may also be coupled to user interface surface 108. Source/sink 110 may output one or more currents or voltages to drive motor 106. These electrical signals may be used to control motor 106 independently of other motors in system 100. For example, these electrical signals may be used to cause motor 106 to speed up or decrease the speed of user interface surface 108, independent of any feedback electrical signal generated using motor 102 that may be applied to motor 104. The electrical signals may also be used to cause motor 106 to assist other motors in driving user interface surface 108. For example, motor 106 may help motor 104 to increase the speed of user interface surface 108 to the requisite speed as a user begins transitioning from a stationary to non-stationary state, thus diminishing or eliminating unnatural ground effects.

At operation 212, method 200 optionally includes varying an input electrical signal that may be applied to motor 106 using source/sink 110. Input electrical signals applied to motor 106 using source/sink 110 may be controlled or otherwise varied to effect a desired motion of user interface surface 108, including based on the virtual reality or other content presented to a user. For example, if the ground surface in the virtual reality or other environment displayed to the user switches from dirt to ice, virtual reality component 134 may be used to alter the input electrical signal applied to motor 106, causing motor 106 to decrease the resistance of user interface surface 108. To accomplish this, virtual reality component 134 may increase the magnitude of a straight polarity signal applied to motor 106, causing motor 106 to increase its speed or responsiveness so as to simulate possible slipping and increased speed that may occur if the user were to actually walk on ice.

Figure 2B:
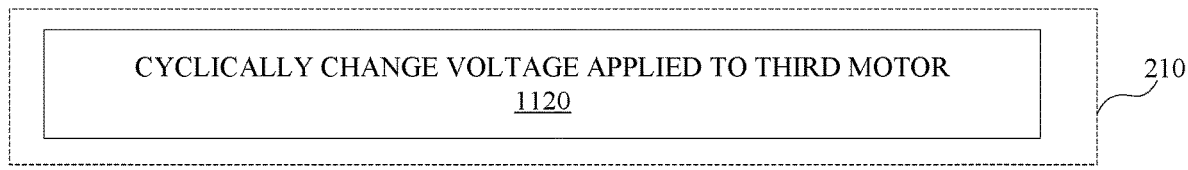
FIG. 2B illustrates additional features that may be associated with providing dynamic virtual reality ground effects.

FIG. 2B illustrates additional features that may be included in certain operations of method 200. For example, in one or more embodiments, varying the input electrical signal according to operation 212 of method 200 may entail, at operation 1120, cyclically changing a voltage applied to motor 106 (and/or another motor of system 100). This may additionally or alternatively entail cyclically changing other electrical signals that may be applied to motor 106, such as current and the like.

By way of example virtual reality component 134 may cyclically vary the voltage(s) and/or current(s) etc. applied to motor 106 in order to provide enhanced ground effects. To illustrate, if a user comes across snow in the virtual reality or other environment, virtual reality component 134 may detect this and cause source/sink 110 to cyclically or non-cyclically generate voltage(s) and/or current(s) etc. that may be applied to motor 106 in order to further increase the accuracy and effect of the phenomena of stepping through snow. The voltage(s) and/or current(s) signals may be cyclically or otherwise repeated (in some cases rapidly, for example, at 0.25 second intervals) and may cause motor 106 to increase or decrease the resistance/responsiveness of user interface surface 108 depending on if the user is picking up or placing the user's foot down in the snow in connection with taking a step. Similarly, these signals may also be used to simulate walking through water, sand, mud, slime, ice, or other related surfaces that may be experienced in the virtual reality or other environment. For example, as mentioned, to simulate an icy surface, the resistance of user interface surface 108 may be decreased (e.g., responsiveness increased), in some cases dramatically, through the control of motor 106 by source/sink 110 (e.g., by applying voltage(s) and/or current(s) etc.).

Returning to FIG. 2A, at operation 214, method 200 optionally includes driving motor 104 (and/or another motor of system 100) with a reverse polarity voltage signal. Motor 104 may additionally or alternatively be driven by other reverse polarity electrical signals, such as current and the like. This may be done if a detected speed of user interface surface 108 exceeds a threshold. By way of example, as a user is running on user interface surface 108, the user may reach or exceed a threshold speed, resulting in unsafe conditions and the possibility of user falling off user interface surface 108. Once a speed at or above the threshold is detected (e.g., using electronic device 112), motor 102 may be used to generate a reverse polarity voltage and/or current to drive motor 104 to begin braking and slow the speed of user interface surface 108 in order to bring the user back to a safe speed. Motor 104 may be the only motor obtaining a reverse polarity voltage or current to slow the speed of user interface surface 108. In some cases, motor 106 may additionally or alternatively obtain a reverse polarity signal to assist motor 102 and/or motor 104 in the process of slowing the speed of user interface surface 108, as will now be described.

Figure 2C:
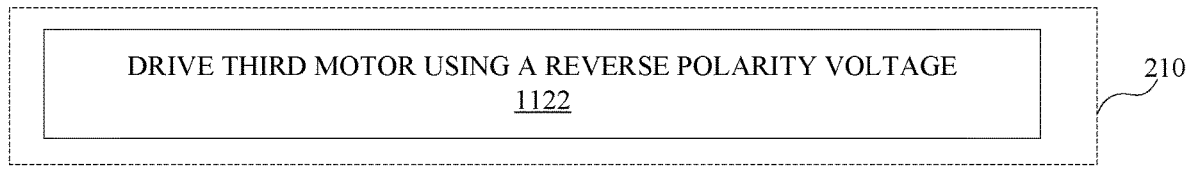
FIG. 2C illustrates additional features that may be associated with providing dynamic virtual reality ground effects.

As shown in FIG. 2C, operation 210 of method 200 optionally includes, at operation 1122, driving motor 106 (and/or another motor of system 100) using a reverse polarity voltage. Motor 106 may additionally or alternatively be driven by other reverse polarity electrical signals, such as current and the like. As described above, if user interface surface 108 meets or exceeds the threshold speed, motor 102 may be used to generate a reverse polarity version of the feedback electrical signal to drive motor 104 to begin braking and slow the speed of user interface surface 108 to bring the user back to a safe speed. Additionally or alternatively, source/sink 110 may be used to generate a reverse polarity voltage or current to drive motor 106 to assist motor 102 and/or motor 104 in slowing the speed of user interface surface 108 in order to bring the user back to a safe speed.

In one or more embodiments, a reverse polarity signal(s) may also be used to drive motor 104 and/or motor 106 if, in the virtual reality or other environment, the user is in an environment where walking and/or moving may be slower than normal, such as, for example, on water, snow, sand, slime, mud, or another surface. In connection with operation 212, virtual reality component 134 may alter the signal used to drive motor 106 (and/or another motor of system 100), in some cases by generating a reverse polarity signal that causes motor 106 to slow the movement of user interface surface 108 and provide resistance to the user while the user is walking. This can simulate the increased difficulty in walking through certain environments.

The amount of resistance provided may depend on the type and amount of a given element (e.g., more resistance to simulate walking through heavy snow than to simulate walking through shallow water). Hence, information relating to the display of virtual reality or other content may be used to control motor 104 and/or motor 106 and ultimately the resistance that user interface surface 108 presents to the user. Changing the polarity of the signal used to drive motor 106 (and/or another motor of system 100) may simulate walking on an incline or a decline (decreased resistance), or any other type of situation in which the resistance the user experiences may be changed to convey realistic ground effects that track what a user experiences in a virtual reality or other environment.

Referring back to FIG. 2A, at operation 216, method 200 optionally includes using electrical signal(s) generated using one or more of motors 102, 103, 104, 106 and/or source/sink 110 to change virtual reality or other content presented to a user. By way of example, a user may wish to transition from walking to running to increase the movement speed of a character in the virtual reality or other environment. As the speed of user interface surface 108 increases, one or more of motors 102, 103, 104, 106 and/or source/sink 110 may be used to generate or may be provided with electrical signals related to this movement. Virtual reality component 134 may then interpret these signals and cause the character in the virtual reality or other environment to move with an increased speed.

Additionally, a user may wish to transition from running to walking and slow the movement of user interface 108. One or more of motors 102, 103, 104, 106 and/or source/sink 110 may be used to generate or be provided with electrical signals related to this movement. Virtual reality component 134 may then interpret these signals and cause the character in the virtual reality or other environment to move at a decreased speed. Further, if a user wishes to cause the perspective or a character in the virtual reality or other environment to turn or rotate, a user may, for example, walk closer to a right or left edge of user interface surface 108. One or more of motors 102, 103, 104, 106 and/or source/sink 110 may be used to generate or may be provided with electrical signals related to this movement. Virtual reality component 134 may then interpret these signals and cause the perspective or character in the virtual reality or other environment to turn or rotate accordingly.

Figure 3:
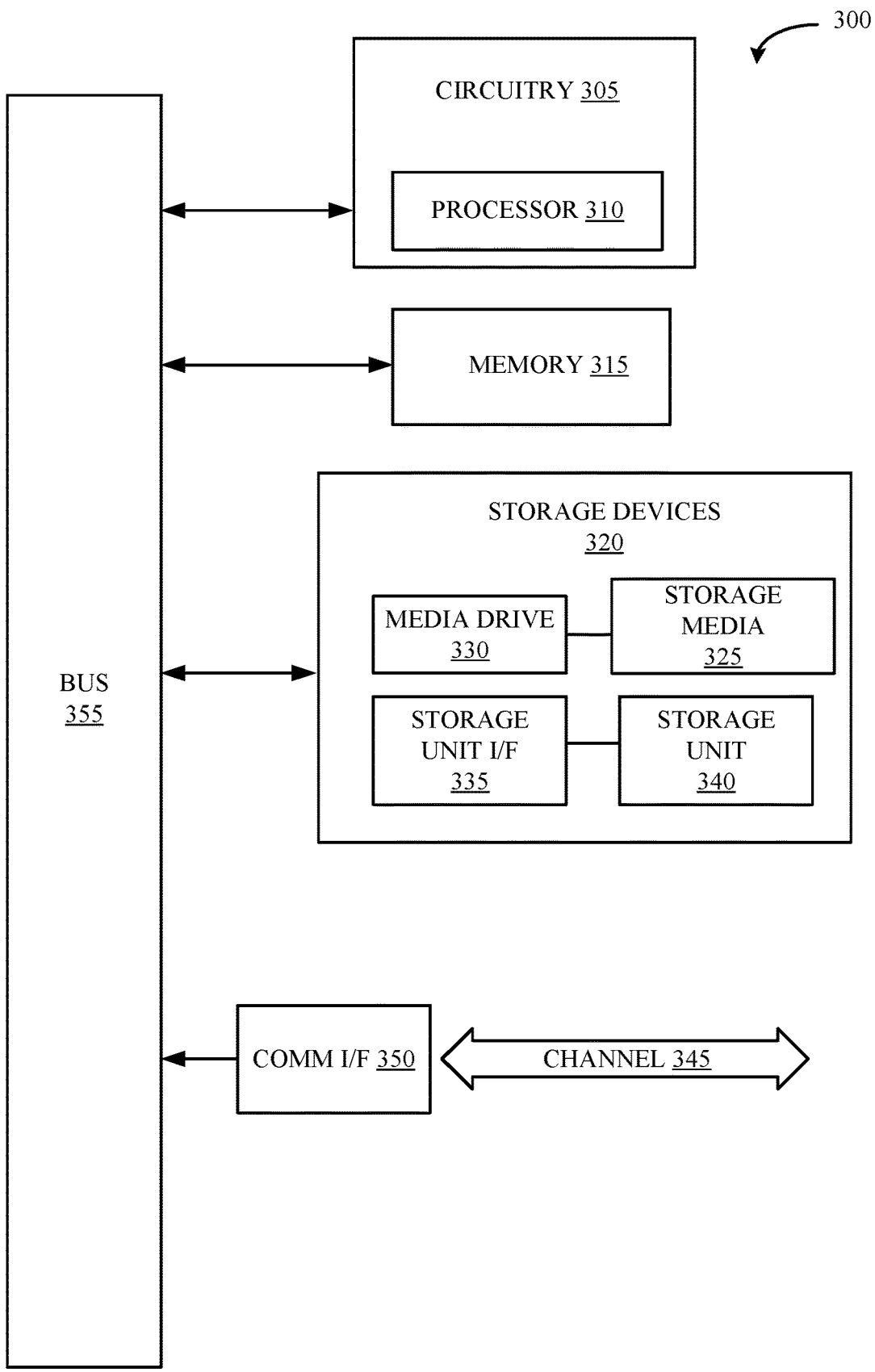
FIG. 3 illustrates an example computing module that may be used to implement features of one or more embodiments of the disclosure.

FIG. 3 illustrates example computing module 300, which may in some instances include a processor/controller resident on a computer system (e.g., electronic device 112, and/or remote devices). Computing module 300 may be used to implement various features and/or functionality of embodiments of the systems, devices, and methods disclosed herein. With regard to the above-described embodiments set forth herein in the context of systems, devices, and methods described with reference to FIGS. 1A through 2C, including embodiments involving system 100, electronic device 112, and/or other remote devices, one of skill in the art will appreciate additional variations and details regarding the functionality of these embodiments that may be carried out by computing module 300. In this connection, it will also be appreciated by one of skill in the art upon studying the present disclosure that features and aspects of the various embodiments (e.g., systems) described herein may be implemented with respect to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand upon studying the present disclosure that these features and functionality may be shared among one or more common software and hardware elements, and such description shall not require or imply that separate hardware or software components are used to implement such features or functionality.

Where components or modules of the application are implemented in whole or in part using software, in embodiments, these software elements may be implemented to operate with a computing or processing module capable of carrying out the functionality described with respect thereto. One such example computing module is shown in FIG. 3. Various embodiments are described in terms of example computing module 300. After reading this description, it will become apparent to a person skilled in the relevant art how to implement example configurations described herein using other computing modules or architectures.

Referring now to FIG. 3, computing module 300 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 300 is specifically purposed.

Computing module 300 may include, for example, one or more processors, controllers, control modules, or other processing devices, such as a processor 310, and such as may be included in circuitry 305. Processor 310 may be implemented using a special-purpose processing engine such as, for example, a microprocessor, controller, or other control logic. In the illustrated example, processor 310 is connected to bus 355 by way of circuitry 305, although any communication medium may be used to facilitate interaction with other components of computing module 300 or to communicate externally.

Computing module 300 may also include one or more memory modules, simply referred to herein as main memory 315. For example, random access memory (RAM) or other dynamic memory may be used for storing information and instructions to be executed by processor 310 or circuitry 305. Main memory 315 may also be used for storing temporary variables or other intermediate information during execution of instructions to be executed by processor 310 or circuitry 305. Computing module 300 may likewise include a read only memory (ROM) or other static storage device coupled to bus 355 for storing static information and instructions for processor 310 or circuitry 305.

Computing module 300 may also include one or more various forms of information storage devices 320, which may include, for example, media drive 330 and storage unit interface 335. Media drive 330 may include a drive or other mechanism to support fixed or removable storage media 325. For example, a hard disk drive, a floppy disk drive, a magnetic tape drive, an optical disk drive, a CD or DVD drive (R or RW), or other removable or fixed media drive may be provided. Accordingly, removable storage media 325 may include, for example, a hard disk, a floppy disk, magnetic tape, cartridge, optical disk, a CD or DVD, or other fixed or removable medium that is read by, written to or accessed by media drive 330. As these examples illustrate, removable storage media 325 may include a computer usable storage medium having stored therein computer software or data.

In alternative embodiments, information storage devices 320 may include other similar instrumentalities for allowing computer programs or other instructions or data to be loaded into computing module 300. Such instrumentalities may include, for example, fixed or removable storage unit 340 and storage unit interface 335. Examples of such removable storage units 340 and storage unit interfaces 335 may include a program cartridge and cartridge interface, a removable memory (for example, a flash memory or other removable memory module) and memory slot, a PCMCIA slot and card, and other fixed or removable storage units 340 and storage unit interfaces 335 that allow software and data to be transferred from removable storage unit 340 to computing module 300.

Computing module 300 may also include a communications interface 350. Communications interface 350 may be used to allow software and data to be transferred between computing module 300 and external devices. Examples of communications interface 350 include a modem or softmodem, a network interface (such as an Ethernet, network interface card, WiMedia, IEEE 802.XX, or other interface), a communications port (such as for example, a USB port, IR port, RS232 port Bluetooth® interface, or other port), or other communications interface. Software and data transferred via communications interface 350 may typically be carried on signals, which may be electronic, electromagnetic (which includes optical) or other signals capable of being exchanged by a given communications interface 350. These signals may be provided to/from communications interface 350 via channel 345. Channel 345 may carry signals and may be implemented using a wired or wireless communication medium. Some non-limiting examples of channel 345 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 315, storage unit interface 335, removable storage media 325, and channel 345. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 300 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A system for providing dynamic virtual reality ground effects,
the system comprising:
a user interface surface; and
a plurality of motors coupled to the user interface surface, wherein at least one motor of the plurality of motors is coupled to a virtual reality component of an electronic device; wherein
a first motor of the plurality of motors is driven by movement of the user interface surface and is used to generate a feedback electrical signal in response to the movement of the user interface surface; and
a second motor of the plurality of motors is driven using the feedback electrical signal.

2. The system of claim 1, wherein a third motor of the plurality of motors is driven by a voltage source.

3. The system of claim 2, wherein the virtual reality component is configured to vary an input electrical signal applied to the third motor using the voltage source.

4. The system of claim 3, wherein the virtual reality component is configured to vary the input electrical signal applied to the third motor based on virtual reality content presented using a display coupled to the electronic device.

5. The system of claim 3, wherein the virtual reality component is configured to vary the input electrical signal by cyclically changing a voltage applied to the third motor.

6. The system of claim 1, wherein the second motor is driven by a reverse polarity version of the feedback electrical signal.

7. The system of claim 6, wherein when a detected speed of the user interface exceeds a threshold, the second motor is driven by the reverse polarity version of the feedback electrical signal.

8. The system of claim 7, further comprising a third motor of the plurality of motors that is driven using a voltage source and when the detected speed exceeds the threshold, the third motor is driven with a reverse polarity voltage from the voltage source.

9. The system of claim 1, wherein the virtual reality component is configured to use an electrical signal generated using at least one motor of the plurality of motors to change virtual reality content presented on a display associated with the electronic device.

10. The system of claim 9, wherein the change to the virtual reality content comprises a directional change, a rotational change, or a vertical change.

11. The system of claim 1, wherein when the user interface surface transitions from a stationary state to a non-stationary state, a straight polarity version of the feedback electrical signal is used to drive the second motor.

12. A method for providing dynamic virtual reality ground effects, the method comprising:
obtaining a user input from a user interface surface;
moving the user interface surface in response to the user input and driving a first motor;
generating a feedback electrical signal by the first motor in response to movement of the user interface surface; and
driving a second motor using the feedback electrical signal, wherein the second motor is coupled to the user interface surface.

13. The method of claim 12, further comprising driving a third motor using a source, wherein the third motor is coupled to the user interface surface.

14. The method of claim 13, further comprising varying an input electrical signal applied to the third motor using the source.

15. The method of claim 14, wherein varying the input electrical signal comprises using virtual reality content presented to a user of the user interface surface.

16. The method of claim 14, wherein the source is a voltage source and varying the input electrical signal comprises cyclically changing a voltage applied to the third motor.

17. The method of claim 12, wherein when a detected speed of the user interface surface exceeds a threshold, driving the second motor using the feedback electrical signal comprises driving the second motor by a reverse polarity version of the feedback electrical signal.

18. The method of claim 17, wherein when the detected speed of the user interface exceeds the threshold, driving a third motor with a reverse polarity voltage from a voltage source.

19. The method of claim 12, further comprising using an electrical signal generated using one or more of the first motor and the second motor to change virtual reality content.

* * * * *